United States Patent [19]

Mayr et al.

[11] 4,341,186

[45] Jul. 27, 1982

[54] AIR INTAKE SYSTEM FOR A MULTI-CYLINDER INTERNAL COMBUSTION ENGINE

[75] Inventors: Bertold Mayr, Gauting; Jiri Seidl, Munich, both of Fed. Rep. of Germany

[73] Assignee: Bayerische Motoren Werke Aktiengesellschaft, Munich, Fed. Rep. of Germany

[21] Appl. No.: 138,075

[22] Filed: Apr. 7, 1980

[30] Foreign Application Priority Data

Apr. 7, 1979 [DE] Fed. Rep. of Germany ....... 2914172

[51] Int. Cl.³ .............................................. F02B 75/18
[52] U.S. Cl. ............................... 123/52 M; 123/59 R
[58] Field of Search ................ 123/52 R, 52 M, 59 R; 60/323

[56] References Cited

U.S. PATENT DOCUMENTS

| | | | |
|---|---|---|---|
| 2,294,326 | 8/1942 | Wirth | 123/52 M |
| 3,783,845 | 1/1974 | Brandstetter | 123/55 VE |
| 3,901,029 | 8/1975 | Kondo et al. | 60/323 |
| 4,111,163 | 9/1978 | Ederer et al. | 123/52 M |
| 4,228,769 | 10/1980 | Gartner et al. | 123/52 M |

Primary Examiner—Craig R. Feinberg
Attorney, Agent, or Firm—Craig and Antonelli

[57] ABSTRACT

An air intake system for a multi-cylinder internal combustion engine, especially an internal combustion engine with fuel injection, the intake system including a multipartite distributor housing to which are connected first and second individual intake pipes with openings thereof lying in mutual opposition within the distributor housing. The distributor housing is divided in an area of the openings of the intake pipes at least in sections in the longitudinal direction of the individual intake pipes. Auxiliary pipes emanate from the openings of the intake pipes and are arranged in a mutually overlapping relationship in the distributor housing so that a simple and compact construction is realized with the possibility of having auxiliary pipes with great lengths within the distributor housing.

9 Claims, 4 Drawing Figures

AIR INTAKE SYSTEM FOR A MULTI-CYLINDER INTERNAL COMBUSTION ENGINE

The present invention relates to an induction system and, more particularly, to an air intake system for a multicylinder internal combustion engine, especially an internal combustion engine with fuel injection, which system includes a multi-partite distributor housing to which are connected first and second individual intake pipes with openings or orifices of the respective intake pipes being disposed in mutual opposition within the distributor housing, which is divided in an area of the openings at least in sections in a longitudinal direction of the individual intake pipes.

An air intake system for an internal combustion engine of the aforementioned type is proposed in, for example, German Offenlegungsschrift 2,527,774 and also discloses a further intake system wherein all individual intake pipes are unilaterally connected to a distributor housing. The distributor housing is divided along a longitudinal plane with openings of all the individual pipes lying approximately in the dividing plane of the bipartite distributor housing. Curved auxiliary pipes may be arranged at the openings of the individual intake pipes and be provided in series in the distributor housing. The auxiliary pipes serve for increasing the vibration or tuning pipe length of the individual intake pipes and such auxiliary pipes may be arranged mutually parallel or in an inclined fashion.

The aim underlying the present invention essentially resides in providing an air intake system for a multi-cylinder internal combustion engine which enables the use of auxiliary pipes of great lengths within a distributor housing.

In accordance with advantageous features of the present invention, the individual intake pipes are arranged in a bipartite distributor housing with openings or orifices of the intake pipes being disposed in opposition to one another in the distributor housing. Auxiliary pipes emanate from the openings of the respective pipes with the auxiliary pipes being arranged in mutually overlapping relationship in the distributor housing.

By virtue of the above-noted features of the present invention, it is possible to advantageously realize a compact arrangement of auxiliary pipes with a maximum length. Moreover, due to the bipartite construction of the distributor housing in an area of the openings of the respective pipes, the auxiliary pipes may be readily disposed into the distributor housing by a simple insertion.

In accordance with a further advantageous development of the present invention, the auxiliary pipes may, for example, be combined in a unit thereby enabling the auxiliary pipes to be mounted with a minimum time delay when the air intake system of the present invention is assembled.

Advantageously, the combining of the auxiliary pipe into a unit may enable such unit of auxiliary pipes to be mounted mechanically in the distributor housing which may be formed from, for example, half-shells. By virtue of such a constructional possibility, the same intake system may be used for various types of internal combustion engines which differ in size and power with the units of the auxiliary pipes having differing length auxiliary pipes available so as to enable a differentiated vibration tuning.

In order to avoid the possible harmful effects of dimensional inaccuracies during the assembly of the air intake system of the present invention, which system may comprise all of the intake pipes or only a specific number thereof, advantageously the auxiliary pipes are combined by way of movable connections. By virtue of the provision of movable connections, it is possible, in an advantageous fashion, to fix the auxiliary pipes in the zone of the openings of the respective intake pipes as well as by way of stops in the distributor housing under a pretensioning so that any additional fastening means may be omitted.

Accordingly, it is an object of the present invention to provide an air intake system for a multi-cylinder internal combustion engine which avoids, by simple means, shortcomings and disadvantages encountered in the prior art.

Another object of the present invention resides in providing an air intake system for a multi-cylinder internal combustion engine which enables a simple and compact arrangement of auxiliary pipes in a distributor housing of the system.

Yet another object of the present invention resides in providing an air intake system for a multi-cylinder internal combustion engine which is readily adaptable for various types of internal combustion engines having different size and power requirements.

A further object of the present invention resides in providing an air intake system for a multi-cylinder internal combustion engine which enables the use of auxiliary pipes having a maximum length.

These and other objects, features, and advantages of the present invention will become more apparent from the following description when taken in connection with the accompanying drawings which show, for the purposes of illustration only, two embodiments in accordance with the present invention, and wherein.

Figure 1:
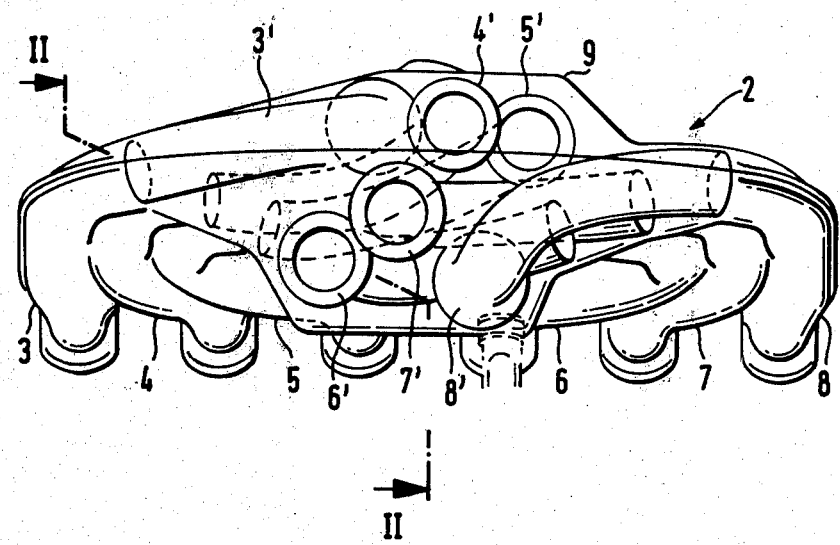
FIG. 1 is a front view of an intake pipe system for a multi-cylinder internal combustion engine with curved auxiliary pipes constructed in accordance with the present invention.
Figure 2:
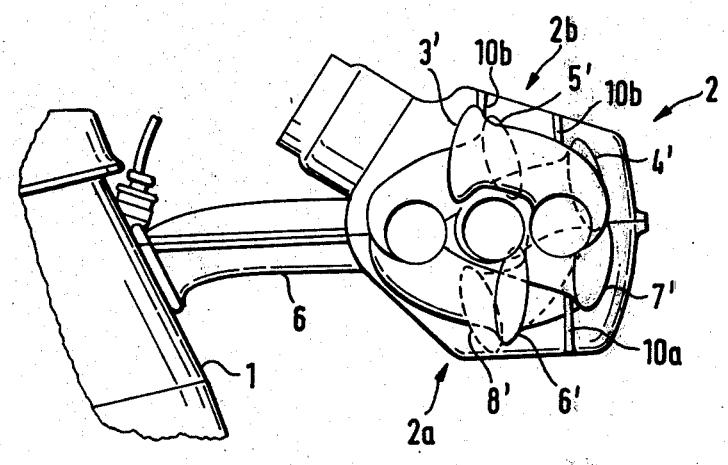
FIG. 2 is a partial cross sectional view taken along the line II—II in FIG. 1.

Referring now to the drawings wherein like reference numerals are used throughout the various views to designate like parts and, more particularly, to FIGS. 1 and 2, according to these figures, an air intake system generally designated by the reference numeral 2 is attached to a cylinder head 1 of a multi-cylinder in-line internal combustion engine, not illustrated in detail. The air intake system 2 comprises first individual intake pipes 3, 4, 5 and second individual intake pipes 6, 7, and 8 as well as a distributor housing 9 to which are connected the first and second individual intake pipes 3–8 with openings of respective pairs of the individual intake pipes lying in mutual opposition within the distributor housing 9.

As shown most clearly in FIG. 2, the air intake system 2 is essentially of a bipartite construction and is formed by two half shells 2a, 2b with a dividing plane of the half shells 2a, 2b extending through all the orifices or openings of the individual intake pipes 3-8 in the distributor housing 9. The dividing plane is finally continued into the individual intake pipes 3-8 adjoining the distributor housing 9.

Figure 3:
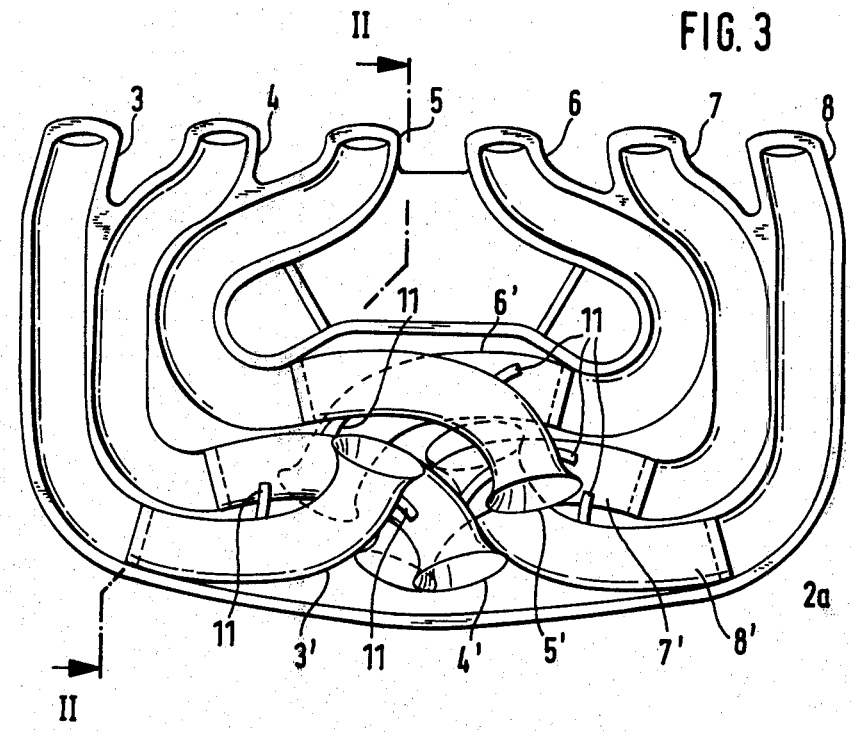
FIG. 3 is a top view of a half shell of the air intake system of FIG. 1 with auxiliary pipes inserted therein.

As shown most clearly in FIG. 3, the individual intake pipes 3-8 for an internal combustion engine of a predetermined power and or size can respectively be of the same length between the cylinder head 1 and the respective orifices or openings in the distributor housing 9.

A longer pipe length of the individual intake pipes 3-8 for an internal combustion engine of the same type with different power characteristics may be obtained by employing auxiliary pipes 3', 4', 5', 6', 7', and 8' arranged in the distributor housing 9. To attain a maximum supplemental length of the auxiliary pipes 3'-8' in the relatively cramped distributor housing 9, the auxiliary pipes 3'-8' may be elbowed or bent at least once and disposed in the distributor housing 9 in an intersecting and/or overlapping relationship.

With an air intake system 2 formed from half shells 2a, 2b, the auxiliary pipes 3'-8' may be inserted in the zones of the orifices or openings of the individual intake pipes 3-8 in one of the half shells 2a, 2b and clamped in place by a joining of the two half shells 2a, 2b. Stops 10a, 10b may be provided in the half shells 2a, 2b for securing the position of the auxiliary pipes 3'-8' in the distributor housing 9.

A rapid mounting of the auxiliary pipes 3'-8' is made possible by combining, for example, all the auxiliary pipes 3'-8' into a single unit. For this purpose, as shown most clearly in FIG. 3, the auxiliary pipes 3'-8' may be combined by way of a flexural and/or movable connection such as, for example, by thin cast webs 11. It is also possible in accordance with the present invention to embed the auxiliary pipes 3'-8' in a synthetic resin foam. Additionally, the auxiliary pipes 3'-8' combined into a unit may be advantageously inserted in one of the half shells 2a, 2b of the air intake system by mechanical means. Furthermore, both half shells 2a, 2b may be joined and connected to each other mechanically so that the air intake system 2 with auxiliary pipes 3'-8' may be manufactured in an economical fashion.

During a joining of the half shells 2a, 2b, the auxiliary pipes 3'-8' are fixed under pretensioning in the zones of the openings of the individual intake pipes 3-8 as well as by way of stops 10a, 10b, so that additional holding means may be eliminated.

Figure 4:
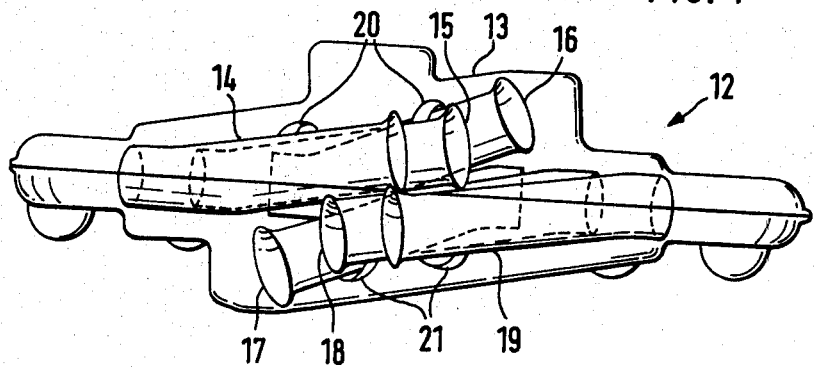
FIG. 4 is a front view of another embodiment of an air intake system in accordance with the present invention with auxiliary pipes which are curved only in sections.

As shown in FIG. 4, an air intake system generally designated by the reference numeral 12 may be provided with a distributor housing 13 being adjoined by first and second individual intake pipes in a similar manner as in the air intake system 2 of FIG. 1. Auxiliary pipes 14-19 are likewise arranged in the distributor housing 13 in an area of mutually opposed openings of the first and second individual intake pipes. Each of the auxiliary pipes 14-19 is formed from two linear sections joined by a single elbowed or single bent section.

By a pivoting of the auxiliary pipes 14, 15 and 16, with respect to one another and with respect to the other auxiliary pipes 17, 18, 19, intersecting auxiliary pipes are obtained for a compact arrangement within the distributor housing 13. The auxiliary pipes 14, 15 and 16 of the first individual intake pipes may be fixed with respect to one another by, for example, elastic webs 20. By way of connecting webs 21, the auxiliary pipes 17, 18 and 19 of the second individual intake pipes may be likewise fixed in position with respect to one another. In order to provide for advantages for the assembly process, the auxiliary pipes 14-19 may also be combined into small units.

While we have shown and described only two embodiments in accordance with the present invention, it is understood that the same is not limited thereto but is susceptible of numerous changes and modifications as known to one having ordinary skill in the art and we, therefore, do not wish to be limited to the details shown and described herein but intend to cover all such changes and modifications as are encompassed by the scope of the appended claims.

We claim:

1. An air intake system for a multi-cylinder internal combustion engine such as a fuel-injected internal combustion engine, the intake system comprising a multi-part distributor housing which is divided into essentially two half shells which are interconnected along a dividing plane which extends in a longitudinal direction across said housing, first and second individual intake pipes connected to the distributor housing, openings of the first and second intake pipes lying in mutual opposition within the distributor housing on the division thereof in said longitudinal direction, characterized in that bent auxiliary pipes are arranged at the respective openings of the individual intake pipes, in that the auxiliary pipes are arranged in the distributor housing in a mutually overlapping relationship when viewed along said dividing plane, said auxiliary pipes having openings at opposite ends thereof which face in different directions, and in that the respective auxiliary pipes are fixed in the openings of the respective intake pipes under a pretensioning by the two half shells of the distributor housing.

2. An air intake system according to claim 1, characterized in that said first and second individual intake pipes extend from the distributor housing in the shape of a bow which is positioned in said dividing plane.

3. An air intake system according to claim 1, characterized in that means are provided for combining the auxiliary pipes into a prefabricated unit whereby rapid mounting of the auxiliary pipes within the distributor housing is made possible.

4. An air intake system according to claim 3, characterized in that said combining means includes a synthetic resinous foam material, and in that the auxiliary pipes are embedded in said synthetic resinous foam material.

5. An air intake system according to claim 3, characterized in that said combining means are constructed so as to enable relative movement between the respective auxiliary pipes.

6. An air intake system according to claim 5, characterized in that said combining means are formed as thin cast webs disposed between at least some of the respective auxiliary pipes.

7. An air intake system according to claim 5, characterized in that said combining means includes elastic webs disposed between at least some of the respective auxiliary pipes.

8. An air intake system according to one of claims 1, 3, 4, 5, 6, or 7, characterized in that position securing stop means are arranged between the respective auxiliary pipes and the distributor housing.

9. An air intake system according to claim 7, characterized in that each of the auxiliary pipes includes two linear sections joined by an elbow portion.

* * * * *